United States Patent [19]
Johnson

[11] Patent Number: 5,579,908
[45] Date of Patent: Dec. 3, 1996

[54] RETAINING ENVELOPE FOR A COMPUTER DISK

[76] Inventor: Robert Johnson, 11332-5 Portobello Dr., San Diego, Calif. 92124

[21] Appl. No.: 506,236

[22] Filed: Jul. 24, 1995

[51] Int. Cl.⁶ ................................................ B65D 85/57
[52] U.S. Cl. ........................ 206/308.3; 206/312; 206/813; 229/68.1; 281/45
[58] Field of Search ................................ 206/308.3, 312, 206/313, 307, 813; 229/68.1; 40/359; 402/79; 281/45

[56] References Cited

U.S. PATENT DOCUMENTS

| | | |
|---|---|---|
| D. 261,155 | 10/1981 | Nast . |
| 1,494,827 | 5/1924 | Warner . |
| 3,145,026 | 8/1964 | Shaw . |
| 3,314,592 | 4/1967 | Streich . |
| 3,489,332 | 1/1970 | Knittel ................................. 229/38.1 |
| 4,473,153 | 9/1984 | Colangelo . |
| 4,488,321 | 12/1984 | Egly . |
| 4,566,590 | 1/1986 | Manning et al. ...................... 206/232 |
| 4,619,399 | 10/1986 | Szmuk et al. . |
| 4,640,413 | 2/1987 | Kaplan et al. . |
| 4,708,285 | 11/1987 | Segall . |
| 4,765,462 | 8/1988 | Rose, Jr. . |
| 4,765,466 | 8/1988 | Ivey . |
| 4,905,831 | 3/1990 | Bagdis et al. ....................... 206/308.3 |
| 5,031,772 | 7/1991 | Woodriff ............................. 206/308.3 |
| 5,050,792 | 9/1991 | Segall . |
| 5,119,933 | 6/1992 | Taylor . |
| 5,147,036 | 9/1992 | Jacobs . |
| 5,170,889 | 12/1992 | Cue ...................................... 206/425 |
| 5,199,743 | 4/1993 | Rosinski, III . |
| 5,255,785 | 10/1993 | Mackey ................................ 206/309 |
| 5,271,502 | 12/1993 | Chang .................................. 206/425 |
| 5,275,438 | 1/1994 | Struhl ................................... 206/232 |
| 5,318,222 | 6/1994 | Bartlett ................................ 206/308.3 |

Primary Examiner—David T. Fidei
Assistant Examiner—Luan K. Bui
Attorney, Agent, or Firm—Michael I. Kroll

[57] ABSTRACT

A retaining envelope is provided for a computer disk which consists of a pocket sized to receive the computer disk therein. A structure is for securing the pocket to a flat article for retainment thereto, so that the computer disk is in a safe and convenient location.

3 Claims, 4 Drawing Sheets

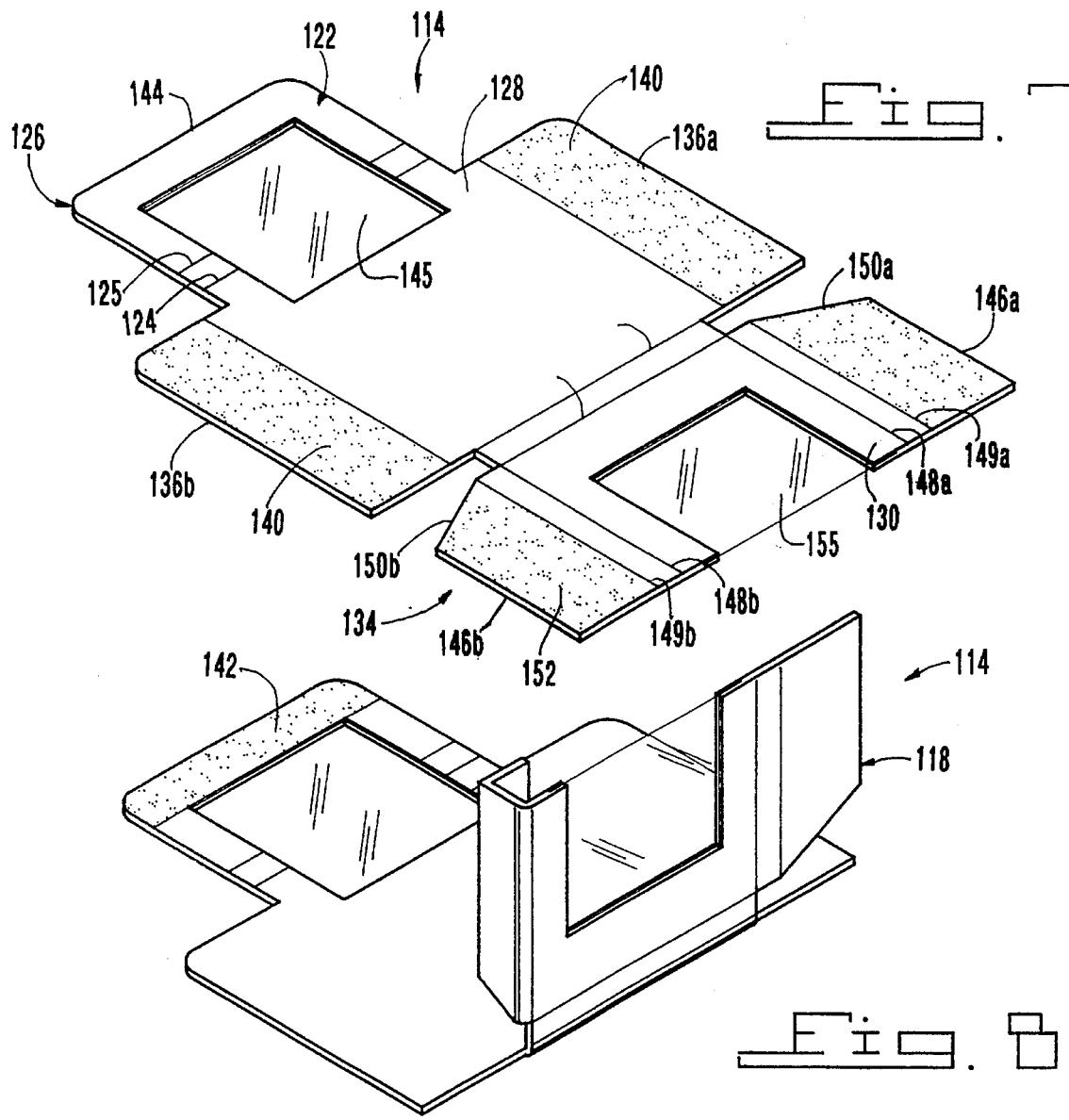
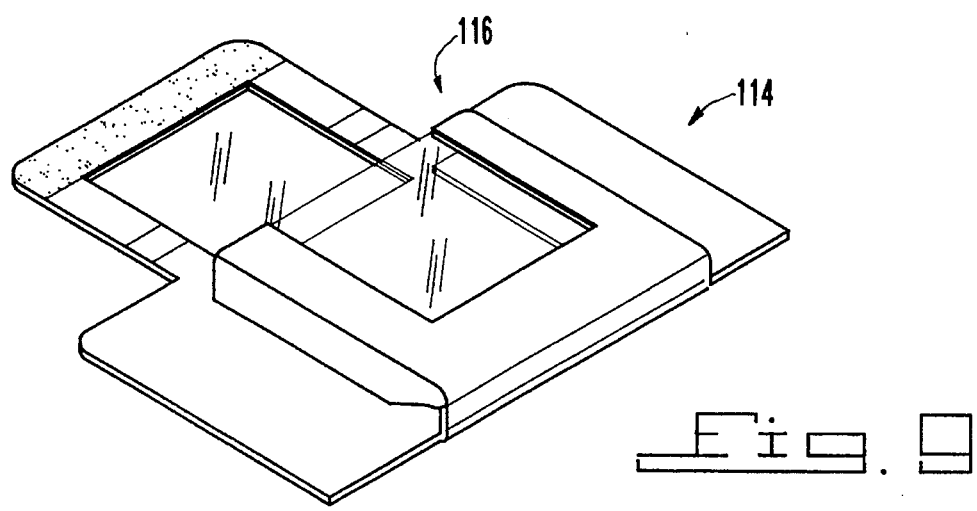

RETAINING ENVELOPE FOR A COMPUTER DISK

BACKGROUND OF THE INVENTION

1. Field of the Invention

The instant invention relates generally to storage envelopes and more specifically it relates to a retaining envelope for a computer disk. Thus, the primary fields to benefit from the invention will be the fields where is necessary to provide portable computer data. Offices with large record keeping needs, such as law offices, doctors offices, or engineering offices will find the benefits of the instant invention to be indispensable. The unique envelope disclosed herein is portable can be easily packaged as stacked multiple unfolded sheets. The individual sheets may be folded, assembled, and attached to any flat surface as desired by the end user.

In a broader sense the envelopes of this invention may be made in any size to accommodate and protect devices or documents of any nature. The novel means for attaching the envelope to any flat surface provides the ultimate in flexibility of use. The envelope may also be detached and reused on another surface without damage to either the surfaces or the envelope. This reusability opens vistas of further potential fields of use.

As an example, students could use the envelope to attach and carry computer disks to their classes within their textbooks. At the end of the semester, when the textbooks are resold to the book store, the disk envelope could be removed without damage to the textbook or reduction of the resale value. Therefore, the invention can provide significant benefits the field of education.

As another example, a flexible assembly line operation could use the invention as follows: A computer disk could be prepared in advance containing all the various items and options ordered for an individual product passing down the assembly line. The disk could be attached to, or adjacent to, the product in the envelope of this invention. When the product reaches an individual work station, the operator at that station could remove the disk from the envelope and read its data so as to determine the specific task to be performed on the product at that station. For example the disk data may contain an instruction such as "paint this one red" for the paint station. The operator would then cause the product to be painted red by the paint station equipment. At an even higher level of automation, the paint station could be completely automated. A robotics arm could remove the disk from the envelope of this invention, insert it into a reader, cause the red paint to be applied, and return the disk to its envelope. The ease of precise placement of the envelope of this invention lends itself well to such a fully automated operation. The fully protected interior of the envelope provides a safe haven for the delicate disk on its journey through the assembly line. Therefore the invention can provide significant benefit to the field of manufacturing.

Other numerous examples could be mentioned, with the variations being limited only by the imagination. Thus it can be seen that the potential fields of use for this invention are myriad, and the particular preferred embodiments described herein are in no way meant to be limited to the particular field chosen for exposition of the details of the invention.

2. Description of the Prior Art

Numerous storage envelopes have been provided in prior art that are adapted to hold computer disks therein, but when placed loosely into folders or books they will fall out and get lost or damaged. While these units may be suitable for the particular purpose to which they address, they would not be as suitable for the purposes of the present invention as described.

The following known prior art has been directed to envelopes which can be considered similar to the instant invention in superficial ways. As will be seen, the simplicity, effectiveness, and sheer utility of my invention is not rivaled in the prior art. The following envelope art is discussed in the interest of providing a full and complete disclosure as well as providing a contrast for the unique features of the instant invention.

U.S. Pat. No. 1,494,827, issued to Orson C. Warner on May 20, 1924, shows an envelope suitable for mailing as first-class matter and adapted to be attached to packages containing second, third, or fourth class matter so that both will arrive and receive attention simultaneously. The patented envelope is similar to the instant invention in that the one-piece blank from which it is formed is similarly shaped. The one-piece blanks, however, are not suitable for stacking because of the exposed recontact adhesive on the blank.

By contrast, the instant invention is not designed to be permanently attached to another item as clearly intended by Warner. Warner's function of insuring simultaneous arrival of the package and the envelope would be completely destroyed if the two were detachable from one another. The instant invention, on the other hand requires that the envelope be easily detached from its carrier item without harming either the envelope or item. Specific structure is included in the instant invention that allows this ease of separation to be achieved. In addition, the instant invention has see-through windows, a feature not hinted at by Warner. In further contrast, the instant invention uses a stepped base so as to make visible several layers of items placed in the envelope without opening the envelope. Warner has no need for and does not suggest such structure. As a final contrast, the instant invention provides one-piece blanks that can be stacked upon one another for storage and packaging because all exposed recontact adhesives are covered with protective strips prior to use.

U.S. Pat. No. 3,314,592, issued to Philip A. Streich on Apr. 18, 1967, shows an envelope containing an advertising combination adapted to be removably attached to an article of merchandise. The one-piece blanks from which the patented envelope is constructed are similar (but not identical) in form to the blanks of the instant invention. The one piece blanks, however, are not suitable for stacking because of the exposed recontact adhesive on the blank. The envelope is formed with tear-off wings which remain on the merchandise after the removal of the envelope.

By contrast, the instant invention is an envelope which is completely removable from the article to which it is attached. Streich's indicated removability is illusory in the sense that only a portion of his envelope is removable from the container with the tear off wings remaining permanently affixed. The instant invention does not have or need perforations in the blank from which the envelope is formed because the entire envelope is removed. The fact that the instant invention may be entirely removed without damage, allows it to be reused many times. Streich's envelope may only be used once. The fact that the instant invention may be removed without damage to the merchandise to which it was attached, allows the merchandise to be reused. An example was given above in reference to the college textbooks. In addition, the instant invention has see-through windows, a feature not hinted at by Streich. In further contrast, the instant invention uses a stepped base so as to make visible several layers of items placed in the envelope without opening the envelope. Streich has no need for and does not suggest such structure. As a final contrast, the instant invention provides one-piece blanks that can be stacked upon one another for storage and packaging because all exposed recontact adhesives are covered with protective strips prior to use.

U.S. Pat. No. 4,588,321, issued to Robert A. Egly on May 13, 1986, discloses a retaining envelope specifically for a magnetic media, such as a computer disk, mounted within a case. Egly does not show a similar envelope form made from a one-piece blank, any sort of removable adhesive, or any other features of the instant invention.

By contrast, the instant invention shows an envelope which can be formed by the user from a simple one-piece blank. The instant envelope contains protectively covered releasable recontact adhesive to allow easy attachment to any desired article. The recontact adhesive permits harm free removal and reuse of both the envelope and the article. In addition, the instant invention has see-through windows, a feature not hinted at by Egly. In further contrast, the instant invention uses a stepped base so as to make visible several layers of items placed in the envelope without opening the envelope. Egly has no need for and does not suggest such structure.

U.S. Pat. No. 5,119,933, issued to Lee R. Taylor on Jun. 9, 1992, discloses a retaining envelope specifically for a magnetic media, such as a computer disk. The patented envelope is not attached to an external device. Instead the envelope is designed to attach to the disk which it encloses so that, when the disk is inserted into the computer, the envelope remains attached to the disk, hanging outside the computer. Taylor's means for attachment of the envelope to the disk is described as an adhesive protected by a pull strip. The adhesive is not stated to be removable from the disk and it is not a recontact adhesive. The patented envelope is not stated to be made from a one piece blank.

By contrast, the instant invention shows an envelope which can be formed by the user from a simple one-piece blank. The instant envelope contains protectively covered releasable recontact adhesive to allow easy attachment to any desired article as well as easy manual forming of the envelope by the user. The recontact adhesive permits harm free removal and reuse of both the envelope and the article. In addition, the instant invention has see-through windows, a feature not hinted at by Taylor. In further contrast, the instant invention uses a stepped base so as to make visible several layers of items placed in the envelope without opening the envelope. Taylor has no need for and does not suggest such structure. As a final contrast, the instant invention provides one-piece blanks that can be stacked upon one another for storage and packaging because all exposed recontact adhesives are covered with protective strips prior to use.

U.S. Pat. No. 5,119,933, issued to Vincent J. Colangelo on Sep. 25, 1984, discloses a retaining envelope specifically for a magnetic media, such as a computer disk. The patented envelope is not attached to an external device. The patented envelope uses recontact adhesive only to hold the cover down. Permanent adhesive is used elsewhere. The envelope is made from a one-piece blank similar, but not identical to, the instant invention. The one piece blanks, however, are not suitable for stacking because of the exposed adhesive on the blank. The patented envelope is not formed by the final user.

By contrast, the instant invention shows an envelope which can be formed by the user from a simple one-piece blank. The one-piece blanks of the instant invention may be stacked for storage and shipping because of the protective covering on all recontact adhesive surfaces. The instant envelope contains protectively covered releasable recontact adhesive to allow easy attachment to any desired article as well as easy manual forming of the envelope by the user. The recontact adhesive permits harm free removal and reuse of both the envelope and the article. In addition, the instant invention has see-through windows, a feature not hinted at by Colangelo. In further contrast, the instant invention uses a stepped base so as to make visible several layers of items placed in the envelope without opening the envelope. Colengelo has no need for and does not suggest such structure.

SUMMARY OF THE INVENTION

This invention relates to an envelope for retaining and protecting computer disks on any surface. More specifically, it relates to such an envelope which may be attached to and detached from a surface without harming either the envelope or the surface to which it is attached. The envelope is made from a one piece blank which is folded, assembled, and attached to a desired surface by the user. Exposed recontact adhesives are covered by protective strips prior to use to allow stacking for storage, shipment, display, and sale of the blanks. An embodiment is shown which is ideal for the containment of multiple disks. A stepped base staggers the tops of the disks for quick identification. Another embodiment includes see-through windows for identification of the individual items within the envelope without opening the envelope cover.

A primary object of the present invention is to provide a retaining envelope for a computer disk that will overcome the shortcomings of the prior art devices.

Another object of the invention is to provide a retaining envelope for a computer disk that can be secured inside a folder or book, so as to retain a computer disk therein in a safe and convenient location.

Another object of the invention is to provide a retaining envelope for a computer disk that can be opened and closed by the simple manipulation of a resealable cover flap.

An additional object of the invention is to provide an improved retaining envelope for a computer disk that is reusable many times and is detachable from its supporting surface without harm to the envelope or the surface and disposable because of its unique construction.

Another object of the invention is to provide such an improved retaining envelope for a computer disk that is entirely held together with recontact adhesives and, in addition, is attached to external surfaces with recontact adhesives.

Another object of the invention is to provide such an improved retaining envelope for a computer disk that in which the recontact adhesives are covered with protective strips prior to the application of the envelope to its desired surface by the user.

A further object of the invention is to provide a retaining envelope for a computer disk that is made from one-piece blanks which are stackable without sticking for transportation, storage, or sale because of the protective strips.

Another object of the invention is to provide a retaining envelope for a computer disk that is capable of enclosing multiple disks in a stacked and staggered relationship so that an index portion of all such stacked disks will be visible without removal from the envelope.

Another object of the invention is to provide a retaining envelope for a computer disk that provides see-through windows so that the enclosed contents of the envelope may be ascertained without opening the envelope.

Finally, it is a general goal of the invention to provide improved elements and arrangements thereof in an apparatus for the purposes described which is inexpensive, dependable and fully effective in accomplishing its intended purposes.

It is submitted that the present invention meets or exceeds all the above objects and goals. Upon further study of the specification and appended claims, further objects and advantages of this invention will become apparent to those skilled in the art.

These and other objects of the present invention will become readily apparent upon further review of the following specification and drawings.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 7 is a perspective view from the rear of another embodiment of the invention as an flat cutout sheet before assembly and having see-through windows.

FIG. 8 is a perspective view from the front of the embodiment shown in FIG. 7 showing a front panel partially folded.

FIG. 9 is a perspective view from the front of the embodiment of FIGS. 7 and 8 showing a fully folded and sealed front panel forming a pocket.

DETAILED DESCRIPTION OF THE PREFERRED EMBODIMENTS

Figure 1:
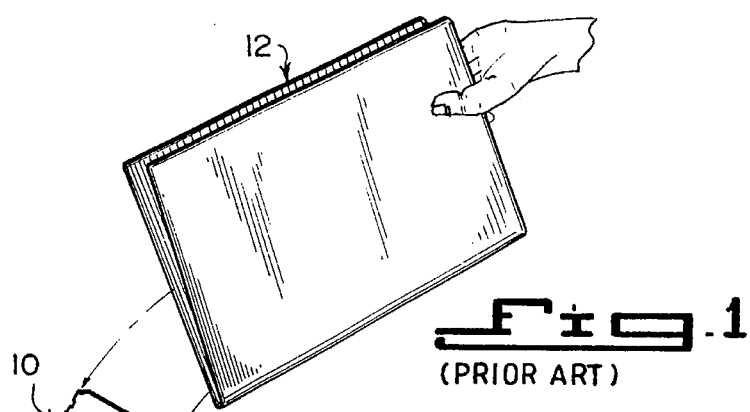
FIG. 1 is a perspective view of the prior art, showing an unrestrained computer disk falling out of a folder.
Figure 2:
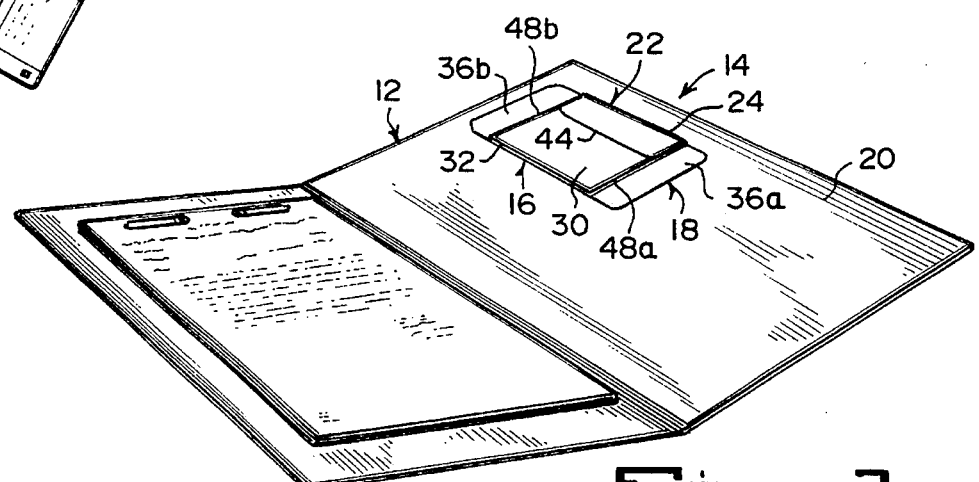
FIG. 2 is a perspective view of the generic envelope of the instant invention secured inside a folder for retaining a computer disk therein.
Figure 3:
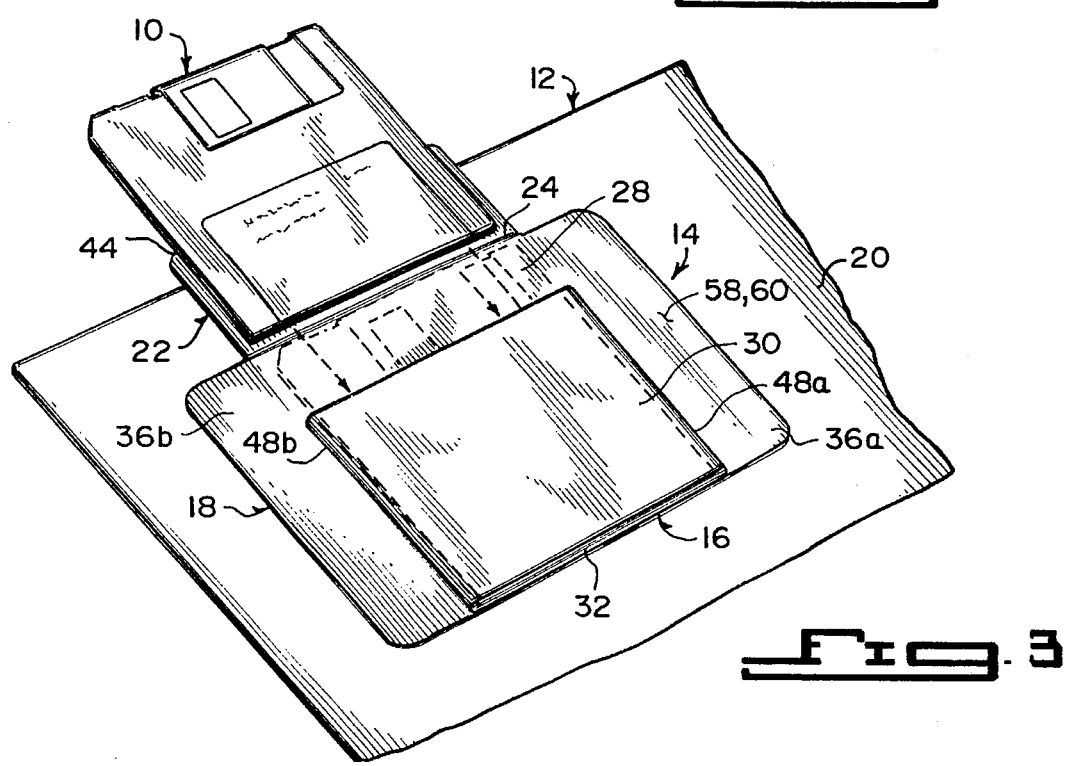
FIG. 3 is an enlarged perspective view of an inside corner of a folder showing a computer disk ready to be inserted within a pocket of the generic envelope of this invention.

Turning now descriptively to the drawings, in which similar reference characters denote similar elements throughout the several views, FIG. 1 shows a typical situation in the prior art in which an unrestrained computer disk 10 is falling out of a typical folder 12. Disks treated in this manner can easily get lost or damaged. FIGS. 2 through 6 illustrate a first embodiment of the instant invention as a retaining envelope 14, for a computer disk 10. The envelope consists of a pocket 16 sized to receive a computer disk 10 therein. Structure 18 is provided for securing pocket 16 to a flat article, such as an internal surface 20 of folder 12. Computer disk 10 is thus held in a safe and convenient location.

Cover 22 has a common top folding edge 24 with pocket 16. When cover 22 is open, computer disk 10 can be inserted and removed from pocket 16. When cover 22 is closed, computer disk 10 is completely enclosed within pocket 16. Retaining envelope 14 further includes fastener 26, for maintaining cover 22 in the closed position.

Pocket 16 contains rear panel 28 and front panel 30 having a common bottom folding edge 32. Apparatus 34 attaches front panel 30, in its folded condition, to rear panel 28, thereby forming pocket 16.

Pocket securing structure 18 consists of a pair of side extensions 36a, 36b, each located on opposite sides 38a, 38b of rear panel 28. Recontact adhesive material 40 is applied to a back surface of each side extension 36a, 36b, so that the side extensions 36a, 36b can be stuck to a flat surface, such as internal surface 20 of folder 12.

The cover maintaining fastener 26 includes recontact adhesive material 42 applied to a front surface of cover 22 along its free outer edge 44, so that when cover 22 is folded to a closed position, it will releasably adhere to front panel 30. The front panel attaching apparatus contains a pair of side flaps 46a and 46b located on opposite sides of front panel 30 with folding edges 48a and 48b, respectively. Forty-five degree chamfers 50a and 50b are formed at side folding edges 48a and 48b. Recontact adhesive material 52 is applied to a back surface of side flaps 46a and 46b, so they can be stuck to a front surface of rear panel 28 after being folded along folding edges 48a and 48b. Front panel 30 is shorter than rear panel 28 so that, when pocket 16 is formed, a portion of computer disk 10 extends above front panel 30. Therefore, disk 10 can be inserted and removed easily when cover 22 is in its open position.

Retaining envelope 14 further includes a plurality of protective strips 54 covering every position of the recontact adhesive material 40, 42, and 52, protective strips 54 are removed from the recontact adhesive material positions 40, 42 and 52 by the end user during assembly and attachment of the envelope to an external surface.

Figure 4:
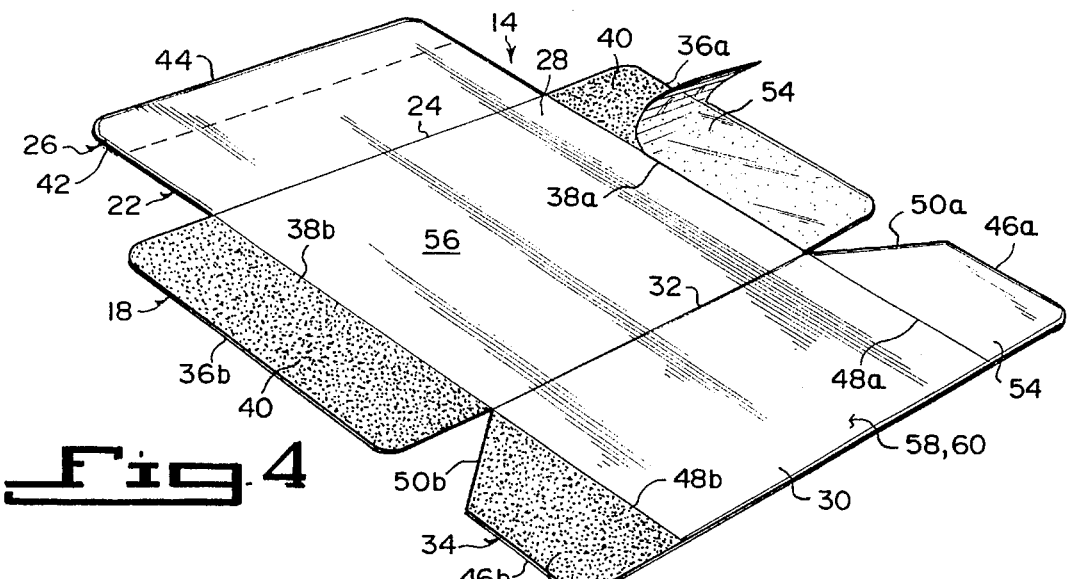
FIG. 4 is a perspective view from the rear of the generic envelope of the instant invention as a flat cutout sheet before assembly.
Figure 5:
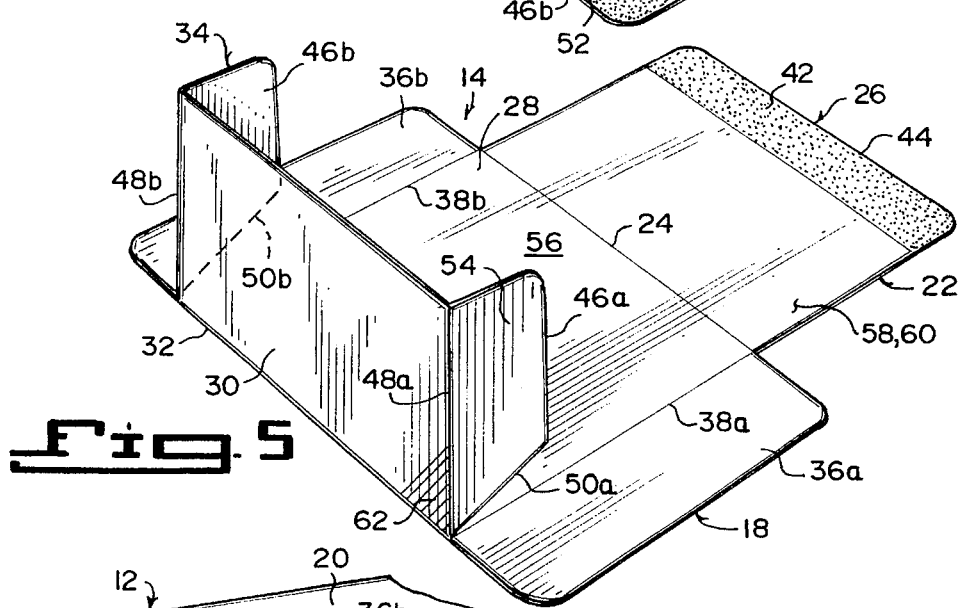
FIG. 5 is a perspective view from the front of the envelope of FIG. 4 showing a front panel partially folded.
Figure 6:
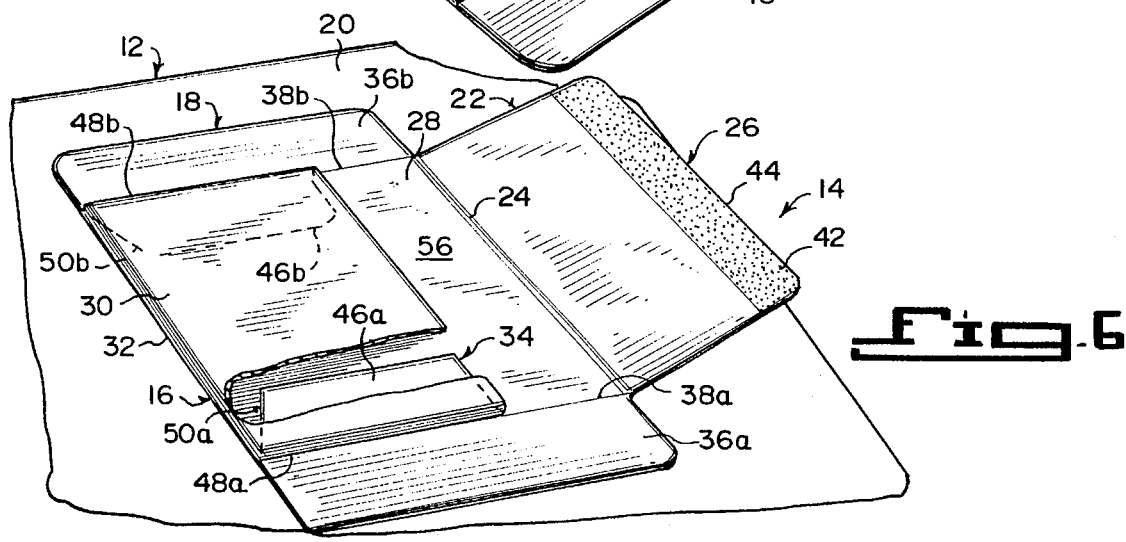
FIG. 6 is a front perspective view with parts broken away, showing side extensions secured to an inside of a folder and a fully folded and sealed front panel forming a pocket.

Retaining envelope 14 is formed from a single flat sheet 56 as shown in FIG. 4. Sheet 56 is fabricated out of a strong paper material 58 or strong thin flexible plastic material 60. Sheet 56 can be produced in various colors and contemporary designs 62, that are pleasing to the eye. Sheet 56 can be pre-printed and customized with information thereon. Sheet 56 can also be left blank, so that a user can write thereon.

Referring now specifically to FIGS. 7 through 9, a second embodiment of a retaining envelope 114 will be described. Similar parts of this embodiment are labeled with the same reference numerals as the previous embodiment plus 100. In other words envelope 14 of the previous embodiment is envelope 114 in this embodiment.

The envelope consists of a pocket 116 sized to receive a computer disk 10 therein. Computer disk 10 is thus held in a safe and convenient location.

Cover 122 has two top folding edges 124 and 125 over pocket 116. These two edges allow the cover to be folded over a thicker pocket than the single fold of the previous embodiment. Therefore, when cover 122 is open, several stacked computer disks 10 can be inserted and removed from pocket 116. When cover 122 is closed, computer disks 10 are completely enclosed within pocket 116. Retaining envelope 114 further includes recontact adhesive 142, for maintaining cover 122 in the closed position.

Pocket 116 contains a similar rear and front panel as the previous embodiment, but this time with two common bottom folding edges 132 and 133 to accommodate additional thickness. Apparatus 134 attaches front panel 130, in its folded condition, to rear panel 128, thereby forming pocket 116.

Pocket securing structure 118 consists of a pair of side extensions 136a, 136b, located on opposite sides of rear panel 128. Recontact adhesive material 140 is applied to a back surface of each side extension 136a, 36b, so that the side extensions can be stuck to a flat surface without folding.

The cover maintaining fastener 126 includes recontact adhesive material 142 applied to a front surface of cover 122 along its free outer edge 144, so that when cover 122 is folded to a closed position, it will releasably adhere to front panel 130. The front panel attaching apparatus contains a pair of side flaps 146a and 146b located on opposite sides of front panel 30 with dual folding edges 148a, 148b, 149a, and 149b, respectively. Chamfers 150a and 150b are formed at side folding edges 149a and 149b. Recontact adhesive material 152 is applied to a back surface of side flaps 146a and 146b, so they can be stuck to a front surface of rear panel 128 after being folded along folding edges 148a, 149a, 148b, and 149b. Front panel 30 is shorter than rear panel 28 so that, when pocket 16 is formed, a portion of computer disk 10 extends above front panel 30. Therefore, disk 10 can be inserted and removed easily when cover 22 is in its open position.

As in the previous embodiment, all areas containing recontact adhesive are covered with protective strips 54. Protective strips 54 are removed from the recontact adhesive material positions 140, 142 and 152 by the end user during assembly and attachment of the envelope to an external surface.

A primary difference between this embodiment and the previous embodiment is the addition of cut outs 145 and 155 which may contain transparent see-through windows if desired. The windows 145 and 155 allow the contents of the closed envelope to be seen.

Figure 10:
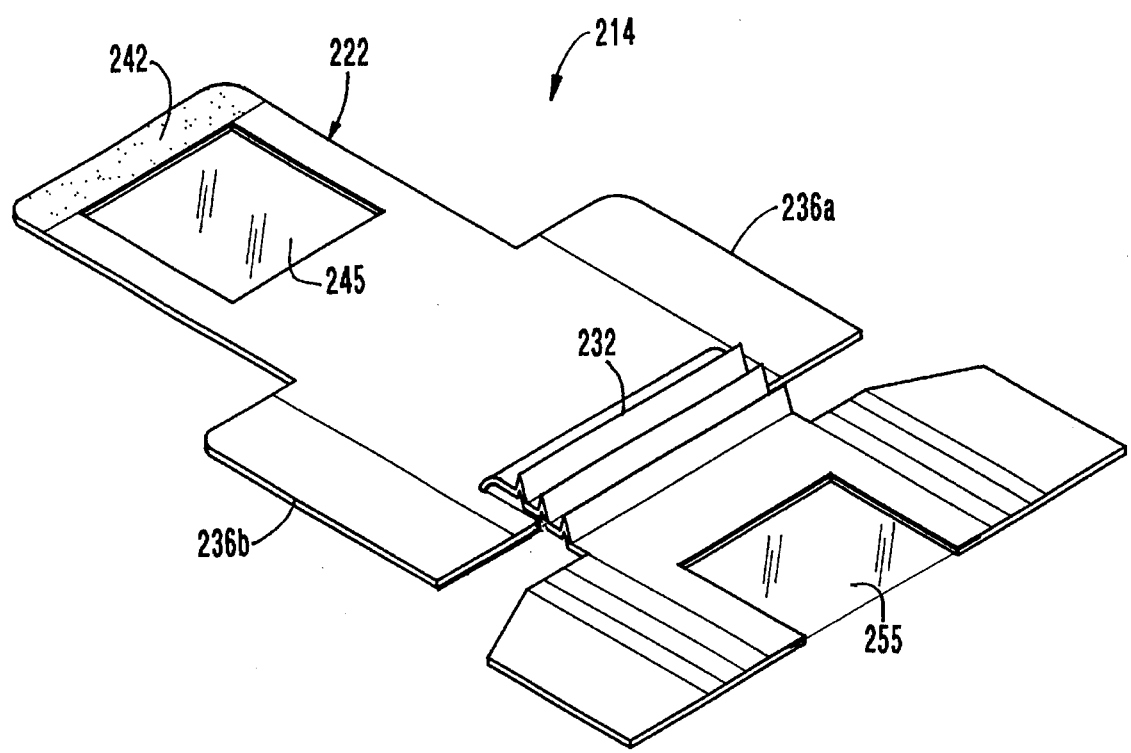
FIG. 10 is a perspective view from the front of yet another embodiment of the envelope shown in a partially folded position and having see-through windows and an accordion fold along the base.
Figure 11:
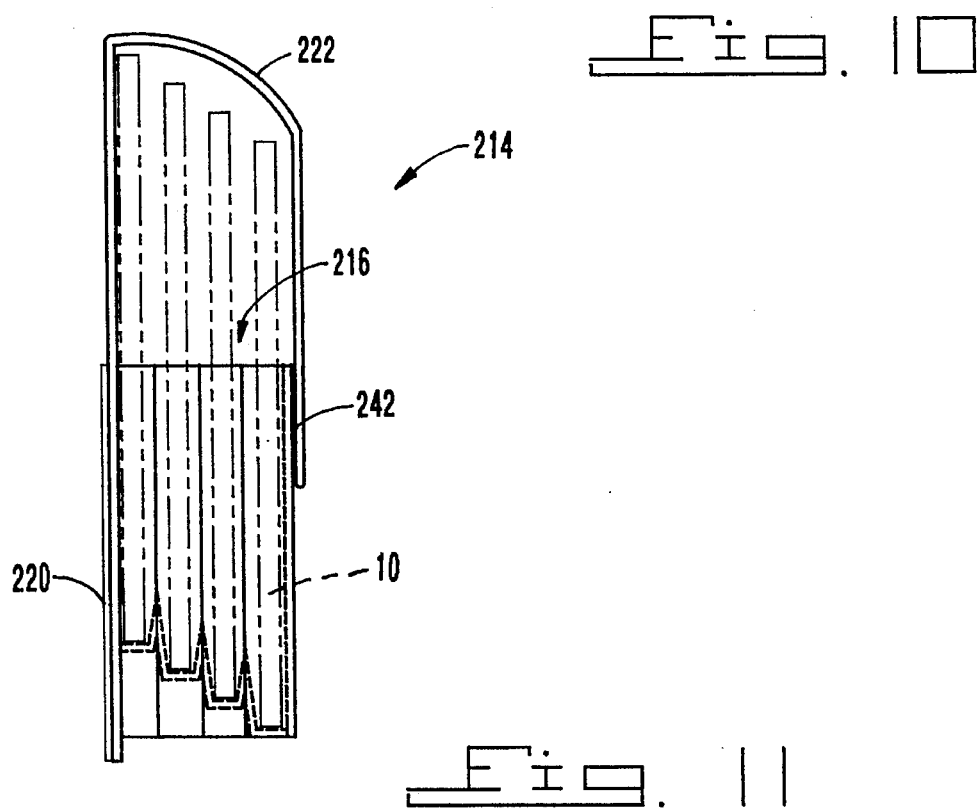
FIG. 11 is a side view of the fully assembled embodiment of FIG. 10 showing the staggered positions of multiple disks held within the envelope.

Referring now specifically to FIGS. 10 and 11, a third embodiment of a retaining envelope 214 will be described. Similar parts of this embodiment are labeled with the same reference numerals as the first embodiment plus 200. In other words envelope 14 of the first embodiment is envelope 214 in this embodiment. In the interest of brevity, the various flaps, recontact adhesive locations, etc., that are similar to the first two embodiments will not be described in detail here. The artisan will find the construction of the third embodiment easy to follow in view of the previous detailed description of the other two embodiments.

Envelope 214 has side flaps coated on their back sides with recontact adhesive for attachment to an external surface such as 220 shown in FIG. 11. Windows 245 and 255 are provided as before. The fold 32 between the back and front surfaces of the finally formed envelope is, in this embodiment replaced with a pleated or accordion fold 232. The purpose of this pleated fold will become apparent upon study of the side view of the assembled envelope in FIG. 11. Note the pleated fold is formed such that a group of disks 10 placed inside will be held in a staggered and stacked fashion. The top of the rearmost disk will be held above the top of the next disk on the stack and so on for every succeeding disk in the stack. In conjunction with the windows, then, it is possible to view identifying indicia on each one of several items placed in the envelope. When these items are computer disks this arrangement makes it convenient to find a specific one of the disks without shuffling through them all.

In all the above embodiments the term recontact adhesive has been used. In accordance with conventional terminology the term is understood to mean as follows: a substance which will adhere two separated surfaces to one another with the application of moderate pressure and which will release those two surfaces without damage or deterioration to either surface upon application of sufficient force opposite in direction to the original pressure. A commercially available example is the "POSTIT" adhesive on paper note pads sold by Minnesota Mining and Manufacturing of Minneapolis, Minn.

LIST OF REFERENCE NUMBERS

10—computer disk
12—folder
14—retaining envelope
114—thick retaining envelope with windows
214—pleated retaining envelope with windows
16—pocket
116—thick pocket
216—pleated pocket
18—pocket securing structure
20—external flat surface
220—external flat surface
22—cover
122—thick cover with window
222—curved cover with window
24—top folding edge
124—one of dual folding edges
125—other of dual folding edges
26—cover maintaining fastener
126—thick cover maintaining fastener
28—rear panel
128—thick envelope rear panel
30—front panel
130—thick envelope front panel
32—bottom folding edge
132—one of dual bottom folding edges
133—other of dual bottom folding edges
232—pleated bottom folding edges
34—front panel attaching apparatus
134—thick envelope front panel attaching apparatus
36a—first side extension
136a—thick envelope first side extension
236a—pleated envelope first side extension
36b—second side extension
136b—thick envelope second side extension
236b—pleated envelope second side extension
38a—first side of 28
38b—second side of 28
40—recontact adhesive material on 36a, 36b
140—recontact adhesive material on 136a, 136b
42—recontact adhesive material on 22

142—recontact adhesive material on 122
242—recontact adhesive material on 222
44—free outer edge of 22
144—free outer edge of 122
46a—first side flap
146a—thick envelope first side flap
46b—second side flap
146b—thick envelope second side flap
48a—first side folding edge
148a—one of dual first side folding edges
48b—second side folding edge
148b—one of dual second side folding edges
149a—other of dual first side folding edges
149b—other of dual second side folding edges
50a—first chamfer
50b—second chamfer
52—recontact adhesive material on 46a, 46b
54—protective strip on recontact adhesives
56—one piece elongate cutout sheet
58—strong paper material for 56
60—plastic material for 56
62—various colors and contemporary designs It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is desired to be protected by Letters Patent is set forth in the appended claims:

I claim:

1. A retaining envelope formed from a single sheet of foldable material mounted unfolded on a flat surface on the inside of a file folder for being folded in place to house a computer disk comprising:

said single sheet of foldable material having a top segment adjacent an upper edge of a central segment, and a bottom segment adjacent a lower edge of said central segment, with each segment having front and back sides normally facing upwardly and downwardly respectively;

said central segment including securing means for fastening said envelope to said flat surface, said securing means including a pair of central side flaps extending outwardly from side edges of said central segment with the entire back side of each said central side flap being coated with a recontact adhesive covered with a protective peel-off cover removed for mounting on said surface;

said top segment having an upper edge portion located opposite said central segment, said upper edge portion being coated on its front side with a releasable first recontact adhesive and covered with a protective peel-off cover;

said bottom segment having a pair of side wings extending outwardly from each side of said bottom segment and with the entire back side of each side wing being coated with a releasable second recontact adhesive and covered with a protective peel-off cover;

each said side wing of said bottom segment being foldable upwardly and inwardly through 180 degrees so as to form overlapped side wings which double the thickness of side edges on said bottom segment with said second recontact adhesive facing upwardly;

said entire bottom segment, including said overlapped side wings, being foldable upwardly through 180 degrees toward said central portion so as to form a folded bottom segment which overlies said central segment with said second recontact adhesive facing downwardly toward and contacting said central segment to form a pocket with an opening facing said top segment;

said top segment being foldable upwardly through 180 degrees toward said central segment so as to overlap both said central segment and said folded bottom segment, so as to cover said opening in said pocket, with said first recontact adhesive facing downwardly against said folded bottom segment; and said sheet when mounted on said surface in an unfolded state with said peel-off covers in place on said top and bottom segments leaving the unfolded sheet ready to be folded in place on said surface to form said pocket to receive a computer disk.

2. The retaining envelope of claim 1, wherein said top and bottom segments are formed with windows which are aligned when said top and bottom segments are folded and overlap each other to form said pocket so as to provide visual access to contents enclosed in the envelope.

3. The retaining envelope of claim 2, wherein said central portion and said bottom segment are connected by means comprising a pleated fold to house a plurality of computer disks in a staggered manner to permit indicia on each computer disk within said envelope to be read without removing other disks.

* * * * *